United States Patent
Flachs et al.

(10) Patent No.: US 8,918,553 B2
(45) Date of Patent: *Dec. 23, 2014

(54) MULTITHREADED PROGRAMMABLE DIRECT MEMORY ACCESS ENGINE

(75) Inventors: Brian K. Flachs, Georgetown, TX (US); Harm P. Hofstee, Austin, TX (US); Charles R. Johns, Austin, TX (US); Matthew E. King, Pflugerville, TX (US); John S. Liberty, Round Rock, TX (US); Brad W. Michael, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,856

(22) Filed: Jun. 5, 2012

(65) Prior Publication Data

US 2012/0246354 A1 Sep. 27, 2012

Related U.S. Application Data

(63) Continuation of application No. 12/950,231, filed on Nov. 19, 2010, now Pat. No. 8,230,136.

(51) Int. Cl.
*G06F 13/28* (2006.01)
*G06F 15/00* (2006.01)
*G06F 15/76* (2006.01)
*G06F 9/30* (2006.01)
*G06F 9/38* (2006.01)
*G06F 13/16* (2006.01)

(52) U.S. Cl.
CPC ........ *G06F 9/30087* (2013.01); *G06F 13/1663* (2013.01); *G06F 13/28* (2013.01); *G06F 9/3877* (2013.01)
USPC ....................... 710/22; 712/2; 712/17; 712/22

(58) Field of Classification Search
CPC ..... G06F 13/28; G06F 13/1663; G06F 9/463; G06F 9/3877; G06F 15/8053
USPC ..................... 710/22; 712/2, 17, 22
See application file for complete search history.

(56) References Cited

U.S. PATENT DOCUMENTS 5,590,345 A * 12/1996 Barker et al. .................. 712/11
5,835,788 A * 11/1998 Blumer et al. ................. 710/23

(Continued)

FOREIGN PATENT DOCUMENTS

CN 101149714 A 3/2008
CN 101221543 A 7/2008

OTHER PUBLICATIONS

Sony, Cell Broadband Engine Architecture, 2006, pp. 24-52, 118, and 305-308.*

(Continued)

*Primary Examiner* — Eric Oberly
(74) *Attorney, Agent, or Firm* — Stephen J. Walder, Jr.; Thomas E. Tyson

(57) ABSTRACT

A mechanism programming a direct memory access engine operating as a multithreaded processor is provided. A plurality of programs is received from a host processor in a local memory associated with the direct memory access engine. A request is received in the direct memory access engine from the host processor indicating that the plurality of programs located in the local memory is to be executed. The direct memory access engine executes two or more of the plurality of programs without intervention by a host processor. As each of the two or more of the plurality of programs completes execution, the direct memory access engine sends a completion notification to the host processor that indicates that the program has completed execution.

17 Claims, 5 Drawing Sheets

(56) References Cited

U.S. PATENT DOCUMENTS

| | | |
|---|---|---|
| 7,218,647 B2 | 5/2007 | Ozguner |
| 7,224,701 B2 | 5/2007 | Ozguner |
| 7,239,635 B2 | 7/2007 | Ozguner |
| 7,523,228 B2 | 4/2009 | Biran et al. |
| 7,617,338 B2 | 11/2009 | Dhong et al. |
| 7,620,749 B2 | 11/2009 | Biran et al. |
| 7,647,483 B2 | 1/2010 | Bates et al. |
| 7,734,827 B2 | 6/2010 | Iwamoto |
| 7,778,271 B2 | 8/2010 | Day et al. |
| 7,822,885 B2 * | 10/2010 | Bouvier .......................... 710/22 |
| 7,870,308 B2 | 1/2011 | Flachs et al. |
| 7,870,309 B2 | 1/2011 | Flachs et al. |
| 2004/0221066 A1 | 11/2004 | Ganfield et al. |
| 2005/0226238 A1 | 10/2005 | Hoskote et al. |
| 2010/0161846 A1 | 6/2010 | Flachs et al. |
| 2010/0161848 A1 | 6/2010 | Flachs et al. |
| 2011/0066769 A1 | 3/2011 | Flachs et al. |

OTHER PUBLICATIONS

U.S. Appl. No. 12/342,280, 2 pages.
U.S. Appl. No. 12/342,501, 2 pages.
U.S. Appl. No. 12/950,231, 1 page.
Sony, "Cell Broadband Engine Architecture", Sony, Oct. 3, 2006, p. 24-52, 118, and 305-308.
Office Action dated Aug. 1, 2012 received from the Chinese Patent Office (SIPO) for Application No. 200910222069.8, 6 pages (untranslated).

\* cited by examiner

MULTITHREADED PROGRAMMABLE DIRECT MEMORY ACCESS ENGINE

This application is a continuation of application Ser. No. 12/950,231, filed Nov. 19, 2010, status allowed.

BACKGROUND

The present application relates generally to an improved data processing apparatus and method and more specifically to an apparatus and method for a multithreaded programmable direct memory access engine.

The Cell Broadband Engine (CBE), a multi-core processor architecture available from International Business Machines, Inc., describes a memory flow controller (MFC) that is specific to each synergistic processing unit (SPU). The main purpose of this memory flow controller is to maintain and process queues of direct memory access (DMA) commands from the MFC's associated SPU or from a power processor element (PPE) or other devices. The MFC's DMA engine executes the DMA commands. This allows the SPU to continue execution in parallel with the MFC's DMA transfers.

This enables software on the PPE or other SPUs to access the MFC resources and control the SPU. Privileged software on the PPE or other SPUs also provides address-translation information to the MFC for use in DMA transfers. DMA transfers are coherent with respect to system storage. Attributes of system storage (address translation and protection) are governed by the page and segment tables of the PowerPC® architecture.

The MFC supports channels and associated Memory Mapped Input/Output (MMIO) registers for the purposes of enqueueing and monitoring DMA commands, monitoring SPU events, performing interprocessor-communication via mailboxes and signal-notification, accessing auxiliary resources such as the decrementer (timer), and other functions. In addition to supporting DMA transfers, channels, and MMIO registers, the MFC also supports bus-bandwidth reservation features and synchronizes operations between the SPU and other processing units in the system.

However, current DMA engines require too much supervision from software running on the host processor, either the PPE or the SPUs, limiting the host processor performance and the total latency of accessing needed data from complex data structures.

SUMMARY

In one illustrative embodiment, a method, in a data processing system, is provided for programming a direct memory access engine operating as a multithreaded processor. The illustrative embodiment receives, from a host processor, a plurality of programs in a local memory associated with the direct memory access engine. The illustrative embodiment receives a request, from the host processor, in the direct memory access engine, to execute the plurality of programs located in the local memory. The illustrative embodiment executes, by the direct memory access engine and without intervention by a host processor, two or more of the plurality of programs. As each of the two or more of the plurality of programs completes execution, the illustrative embodiment sends, by the direct memory access engine, a completion notification to the host processor that indicates that the program has completed execution.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present disclosure will be described in, or will become apparent to those of ordinary skill in the art in view of, the following detailed description of the example embodiments of the present disclosure.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
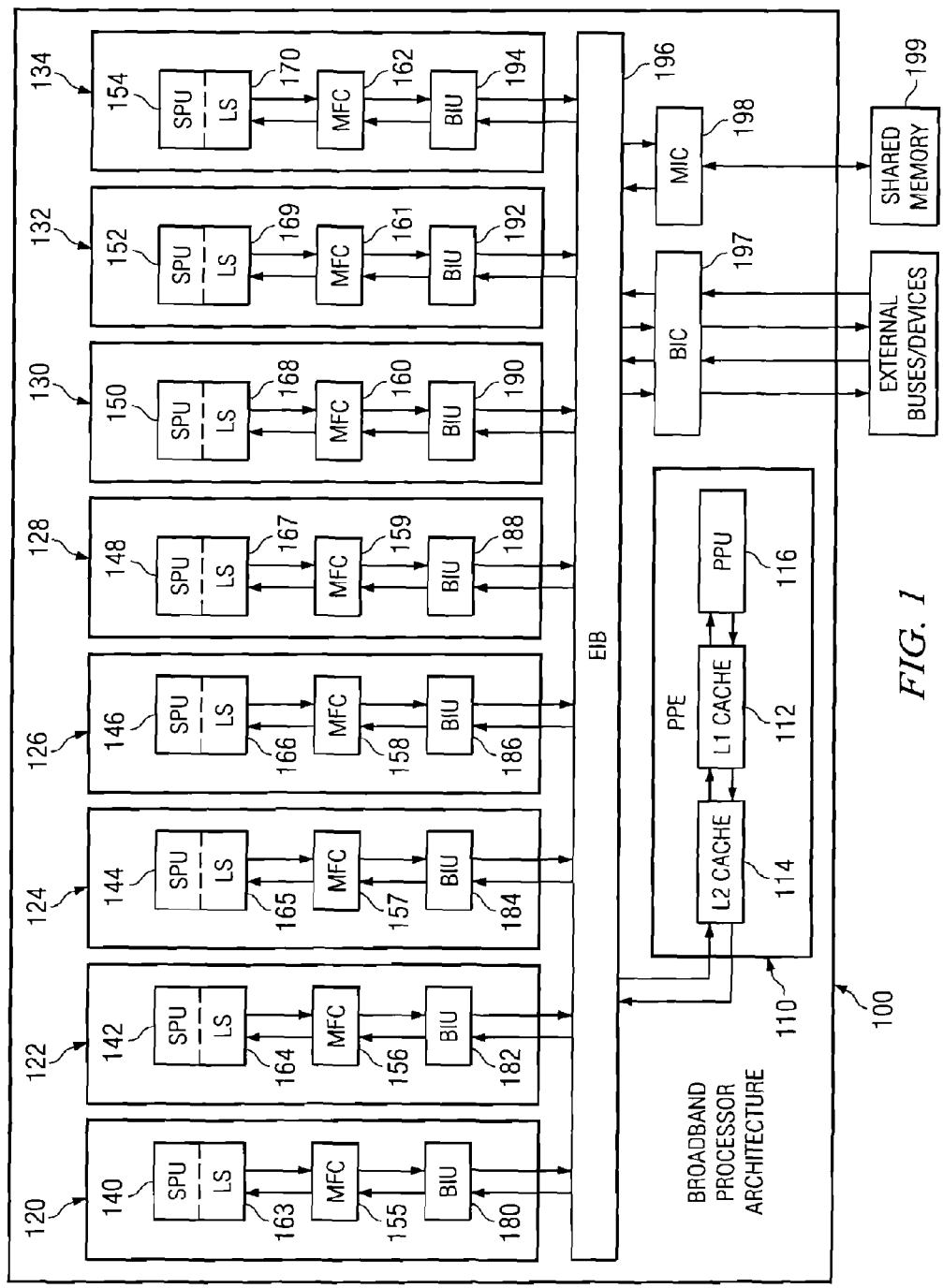
FIG. 1 is an exemplary block diagram of a data processing system in which aspects of the present disclosure may be implemented.

The illustrative embodiments provide a mechanism for an enhanced multithreaded direct memory access (DMA) engine that comprises a complex instruction set. DMA requests from a synergistic processing unit (SPU) may be coded in programs written in the DMA instruction set that modify data in a linked list, such as transferring data, parsing data, reformatting data, traversing data structures found in the data, or the like. Entire DMA instruction sets may then be executed simultaneously by the DMA engine without intervention by the host processor.

As will be appreciated by one skilled in the art, the present disclosure may be embodied as a system, method, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present disclosure may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
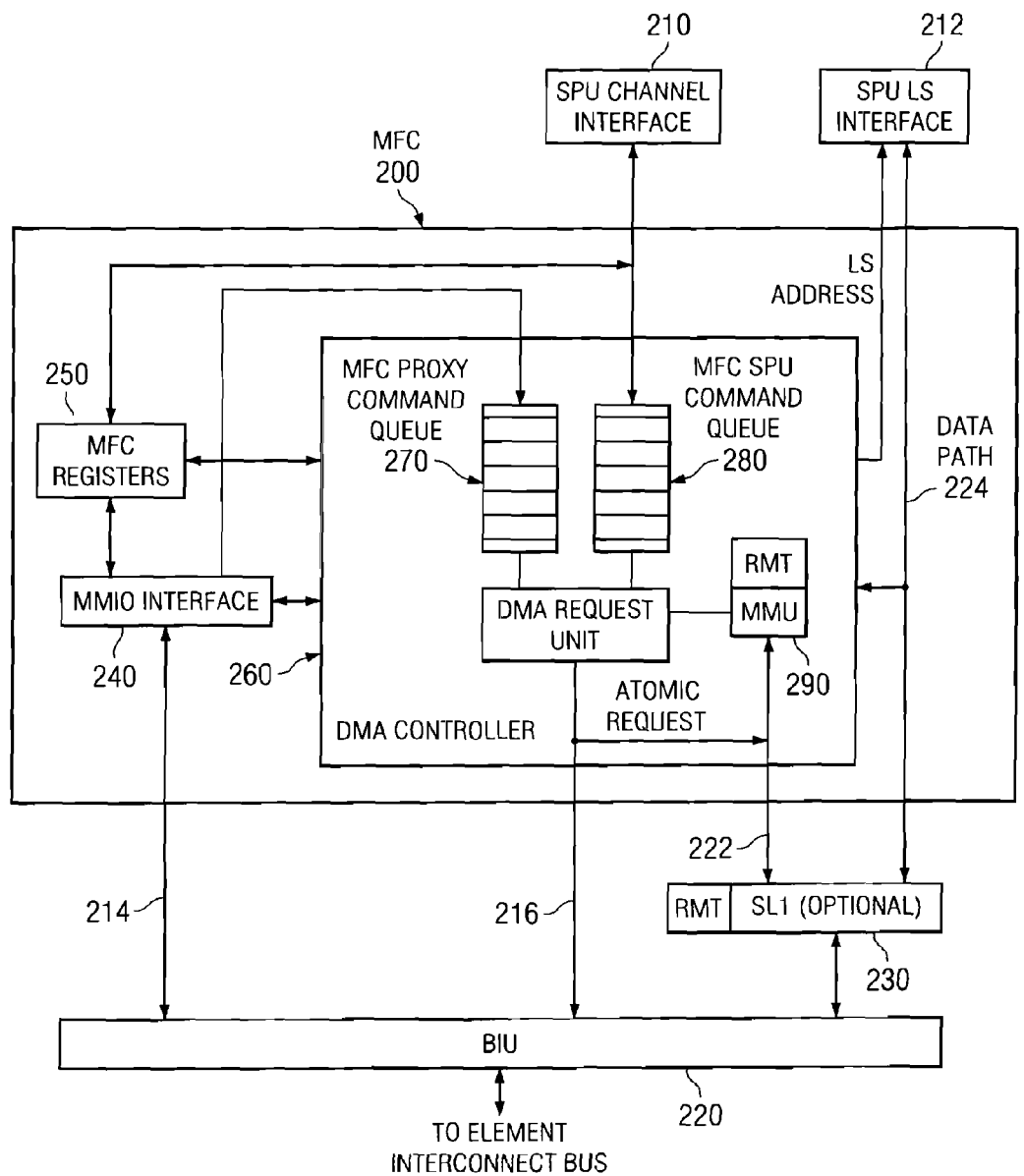
FIG. 2 is an exemplary block diagram of a typical memory flow control (MFC) unit 200 in accordance with an exemplary embodiment of the present disclosure.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a programmable direct memory access (DMA) engine, this is only an example and is not intended to state or imply any limitation with regard to the features of the present disclosure. To the contrary, the illustrative embodiments are intended to include distributed data processing environments and embodiments in which a multithreaded DMA engine may be programmed to execute instructions simultaneously without intervention of a host processor.

With reference now to the figures and in particular with reference to FIGS. 1-2, example diagrams of data processing environments are provided in which illustrative embodiments of the present disclosure may be implemented. It should be appreciated that FIGS. 1-2 are only examples and are not intended to assert or imply any limitation with regard to the environments in which aspects or embodiments of the present disclosure may be implemented. Many modifications to the depicted environments may be made without departing from the spirit and scope of the present disclosure.

With reference now to the figures, FIG. 1 is an exemplary block diagram of a data processing system in which aspects of the present disclosure may be implemented. The exemplary data processing system shown in FIG. 1 is an example of the CELL Broadband Engine (CBE) data processing system. While the CBE will be used in the description of the preferred embodiments of the present disclosure, the present disclosure is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA) engine, memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 160-174, and an interface unit 180-194. The local memory or store 160-174, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 160-174. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

FIG. 2 is an exemplary block diagram of a typical memory flow control (MFC) unit 200 in accordance with an exemplary embodiment of the present disclosure. In this exemplary embodiment, the MFC 200 has two interfaces 210 and 212 to the synergistic processor unit (SPU), two interfaces 214 and 216 to the Bus Interface Unit (BIU) 220, and two interfaces 222 and 224 to an optional SL 1 cache 230. The SPU interfaces 210 and 212 are the SPU channel interface 210 and the SPU local storage interface 212. The SPU channel interface 210 allows the SPU to access MFC facilities and to issue MFC commands. The SPU local storage interface 212 is used by the MFC 200 to access the local storage in the SPU. One interface 216 to the BIU 220 allows Memory Mapped I/O (MMIO) access to the MFC facilities. This interface 216 also allows other processors to issue MFC commands. Commands issued using MMIO are referred to as MFC proxy commands.

The interfaces 222 and 224 to the SL1 cache are mainly for data transfers. One interface 222 is used by the MFC 200 for access to the address translation tables in main storage and the other interface 224 is used for the transfer of data between main storage and local storage.

As shown in FIG. 2, the main units in a typical MFC include a memory mapped input/output (MMIO) interface 240, MFC registers 250, and DMA engine 260. The MMIO interface 240 maps the MFC facilities of the SPU into the real address space of the system. This allows access to the MFC facilities from any processor, or any device in the system. In addition, the MMIO interface 240 may be configured to map the local storage of the SPU into the real address space. This allows direct access to the local storage from any processor or any device in the system, enabling local-store-to-local-store transfers and the ability for I/O devices to directly access the local storage domain of an SPU.

The MFC registers unit 250 contains most of the MFC facilities. Of particular importance to the present disclosure, the MFC registers unit 250 includes an SPU local storage limit register facility. With this facility, privileged software may set a limit on the size of the local storage of the SPE, as will be described in greater detail hereafter.

The synchronization and the transfer of data is generally the responsibility of the DMA engine 260 within the MFC 200. The DMA engine 260 can move data between the local storage of an SPU and the main storage area. Optionally, the data can be cached in the SL1 cache.

The SPE and power processor element (PPE) instruct the MFC 200 to perform these DMA operations by queuing DMA command requests to the MFC through one of the command queues 270 and 280. Commands issued by an SPE are queued to the MFC SPU command queue 270. Commands issued by a PPE are queued to the MFC proxy command queue 280. The MFC uses a memory mapping unit (MMU) 290 to perform all MFC address translations and MFC access protection checks required for the DMA transfers.

MFC commands provide the main method that enables code executing in a SPU to access main storage and maintain synchronization with other processors and devices in the system. Commands are also provided to manage optional caches. MFC commands can either be issued by code running on the SPU, or by code running on another processor or device, such as the PPE. Code running on the associated SPU executes a series of channel instructions to issue an MFC command. Code running on other processors or devices performs a series of memory mapped I/O (MMIO) transfers to issue an MFC command to an SPE. The commands issued are queued to one of the command queues 270 and 280.

In general, commands can be queued using MMIO registers of the MFC registers unit 250, or through channel instructions executed by the associated SPU. The MMIO method is intended for use by the PPE to control the transfer of data between main storage and the associated local storage on behalf of the SPE. MFC commands that transfer data are referred to as MFC DMA commands. The data transfer direction for MFC DMA commands is always referenced from the perspective of an SPE. Therefore, commands that transfer data into an SPE (from main storage to local storage) are considered get commands, while commands that transfer data out of an SPE (from local storage to main storage) are considered put commands.

Commands that transfer data are referred to as MFC DMA commands. These commands are converted into DMA transfers between the local storage domain and main storage domain. Each MFC can typically support multiple DMA transfers at the same time and can maintain and process multiple MFC commands. Each MFC DMA data transfer command request involves both a local storage address (LSA) and an effective address (EA). The local storage address can directly address only the local storage area of its associated SPU. The effective address has a more general application in that it can reference main storage, including all the SPU local storage areas, if they are aliased into the real address space.

Referring again to FIGS. 1 and 2, with the above architecture, an operating system runs on the PPE 110 whose purpose it is to control and orchestrate the operation of the SPEs 120-134. The PPE 110, executing the operating system, initializes programs, or portions of programs, e.g., threads, to be run on each of the SPEs 120-134. When the PPE 110 causes a SPE 120-134 to perform a context switch, i.e. changes the program or portion of a program being executed by the SPE 120-134, the PPE 110 initializes the SPE 120-134 for execution of the new program or portion of a program. This initialization may involve, for example, setting values in a number of SPU control registers, i.e. registers in the MFC registers unit 250 in FIG. 2, which store values for controlling various operational characteristics of the SPE 120-134.

With the present disclosure, a facility is provided in the SPEs 120-134 for defining a size limit for the local storage 163-170. This facility is a privileged facility, i.e. it can only be accessed by privileged software running on the PPE 110 or SPE 120-134. In particular, this facility may only be written to by the operating system, or other privileged software, running on the PPE 110. This facility may be read by the operating system, or other privileged software, running on the PPE 110 as well as the SPE 120-134 itself, e.g., the memory flow controller (MFC), to access the local storage 163-170.

In particular, the facility of the present disclosure includes a local storage limit register (LSLR), which may be part of the MMIO registers in the MFC registers unit 250, and corresponding circuitry for writing to and reading from the LSLR. The PPE 110 may write a value to this LSLR, via the MMIO interface 240 to thereby control the size of the local storage associated with the SPE 120-134. This value may be, for example, an offset value, from a base address, for identifying a maximum accessible address for the local storage, the actual maximum accessible address itself, an actual size value or the like. Each SPE 120-134 may contain such a LSLR and each LSLR may be programmed with the same or different values.

That is, the LSLR is unique to each SPE and a system containing multiple SPEs may have a different value in each of the SPEs.

Each time there is a context switch in the SPE 120-134, the PPE 110 has the ability to set the value stored in the LSLR for that SPE. A default value of the LSLR may be the maximum size of the local storage 163-170. A context switch is any change in the program or portion of a program, e.g., thread, that is being executed by the SPU 140-154 of the SPE 120-134. This allows the PPE 110 to set the size of the local storage 163-170 for programs or portions of a program that are sensitive to the size of the local storage 163-170.

The size limit value that is stored in the LSLR is used with each access of the local storage 163-170, whether that access is from the SPU 140-154 associated with the local storage 163-170 or from external processors, i.e. the PPE 110 or other SPEs 120-134. If the local storage 163-170 is accessed from the SPU 140-150, the local storage address is utilized. If the local storage 163-170 is accessed from an external device, such as the PPE 110 or another SPU 140-154, then the effective address is converted to a local storage address, which is then used to access the local storage 163-170. For purposes of the following disclosure, in order to avoid any confusion regarding which address is being utilized, the term "request address" will be used to refer to either the local storage address or the effective address received in an access request, depending upon which unit is attempting to access the local storage, i.e. the associated SPU or an external device. It should be noted, however, that in either case, the address that is ultimately compared against the size limit value stored in the LSLR is a local storage address that either was supplied by the SPU 140-150 or is the result of the conversion of an effective address.

As one example of using the size limit value to limit the size of the local storage, when the SPU, e.g., SPU 140, associated with the local storage, e.g., local storage 163, accesses the local storage 163 using a request address, the local storage address corresponding to the request address is compared against the local storage limit size value stored in the LSLR. If the local storage address is less than the local storage limit size, then the local storage address is used to access the appropriate portion of the local storage 163. If the local storage address is equal to or greater than the local storage limit size, then a modulo (mod) of the local storage address with respect to the local storage limit size is used to access an appropriate portion of the local storage 163. In effect, when the local storage limit size is reached, the local storage 163 wraps back to a starting address and accesses instructions/data previously stored in the local storage 163.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multiprocessing (SMP) system mentioned previously, without departing from the spirit and scope of the present disclosure.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

The illustrative embodiments provide a mechanism for an enhanced direct memory access (DMA) engine that comprises a complex instruction set. DMA requests from a synergistic processing unit (SPU) may be coded in programs written in the DMA instruction set that modify data in a linked list. The entire DMA instruction set may then be executed by the DMA engine without intervention by the host processor.

Figure 3:
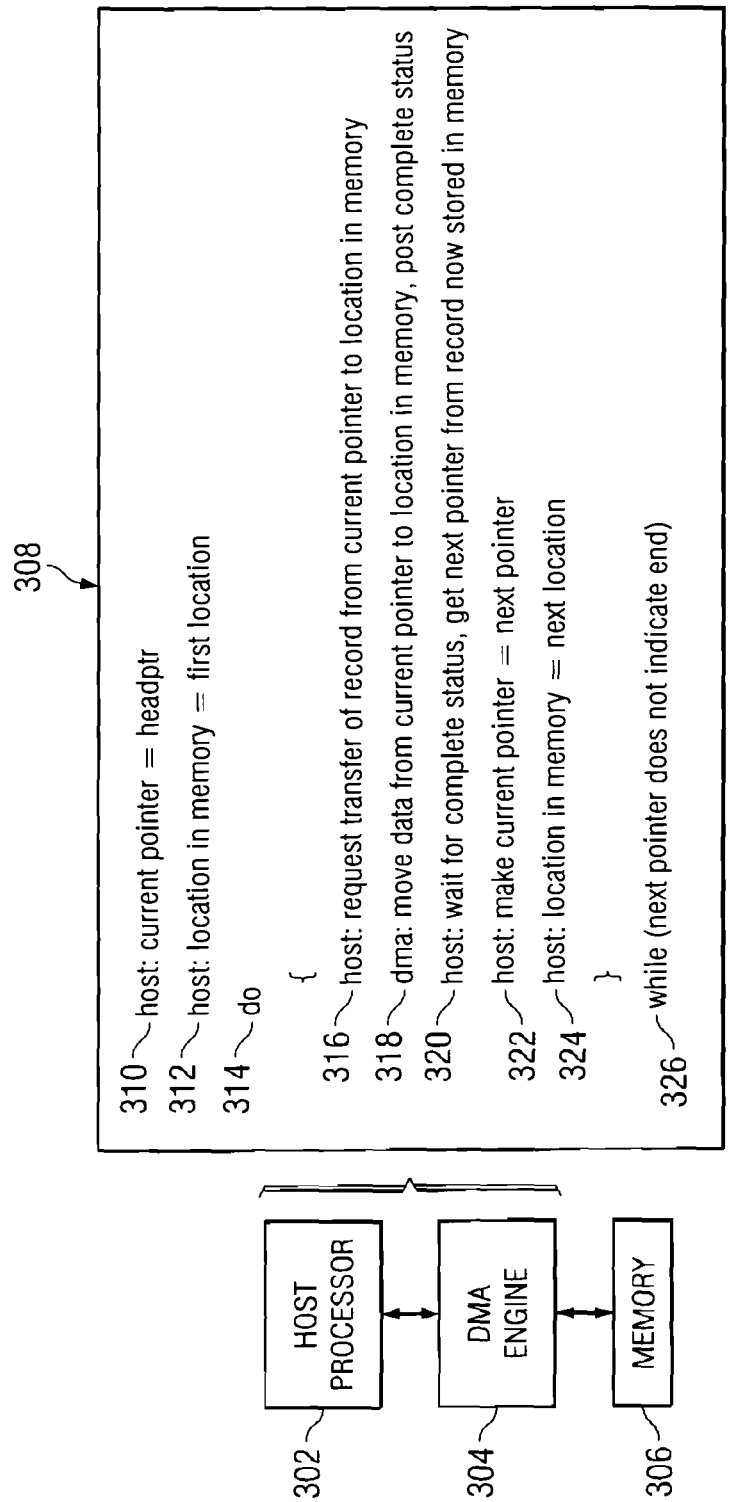
FIG. 3 illustrates an example of a current process to modify data in a linked list by transferring data that is stored in memory to a different location within the memory or to a local storage in accordance with an illustrative embodiment.

FIG. 3 illustrates an example of a current process to modify data in a linked list by transferring data that is stored in memory to a different location within the memory or to a local storage in accordance with an illustrative embodiment. When data is to be transferred to a memory, host processor 302, such as a synergistic processor unit (SPU), power processor element (PPE), or the like, interacts with direct memory access (DMA) engine 304 in order to transfer the data in a linked list within memory 306 to another location within memory 306 or to a local storage. Pseudo code 308 depicts an example of an interaction between host processor 302 and DMA engine 304. In pseudo code 308, host processor 302 sets a current pointer of the data equal to headptr at step 310. The headptr is a pointer to the first element in the linked list. Host processor 302 then sets the intended location of the data in memory equal to a first location pointer at step 312.

At step 314, host processor 302 implements a do function where host processor 302 requests transfer of record from current pointer to location in memory at step 316. At step 318, DMA engine 304 moves data from current pointer to location in memory and posts a complete status back to host processor 302. At step 320, host processor 302 waits for the complete status from DMA engine 304 and, once the complete status is received, gets the next pointer from record now stored in memory. Host processor 302 then makes the current pointer equal to the next pointer at step 322 and makes location in memory equal to next location at step 324. The do function continues until the next pointer indicates an end at step 326.

At step 318, once DMA engine 304 posts a complete status back to host processor 302, the data from the linked list is now in a series of data buffers in memory 306. The interaction of host processor 302 may be driven by an interrupt on DMA complete command. However, the process of driving the data transfer by host processor 302 requires numerous host cycles.

Figure 4:
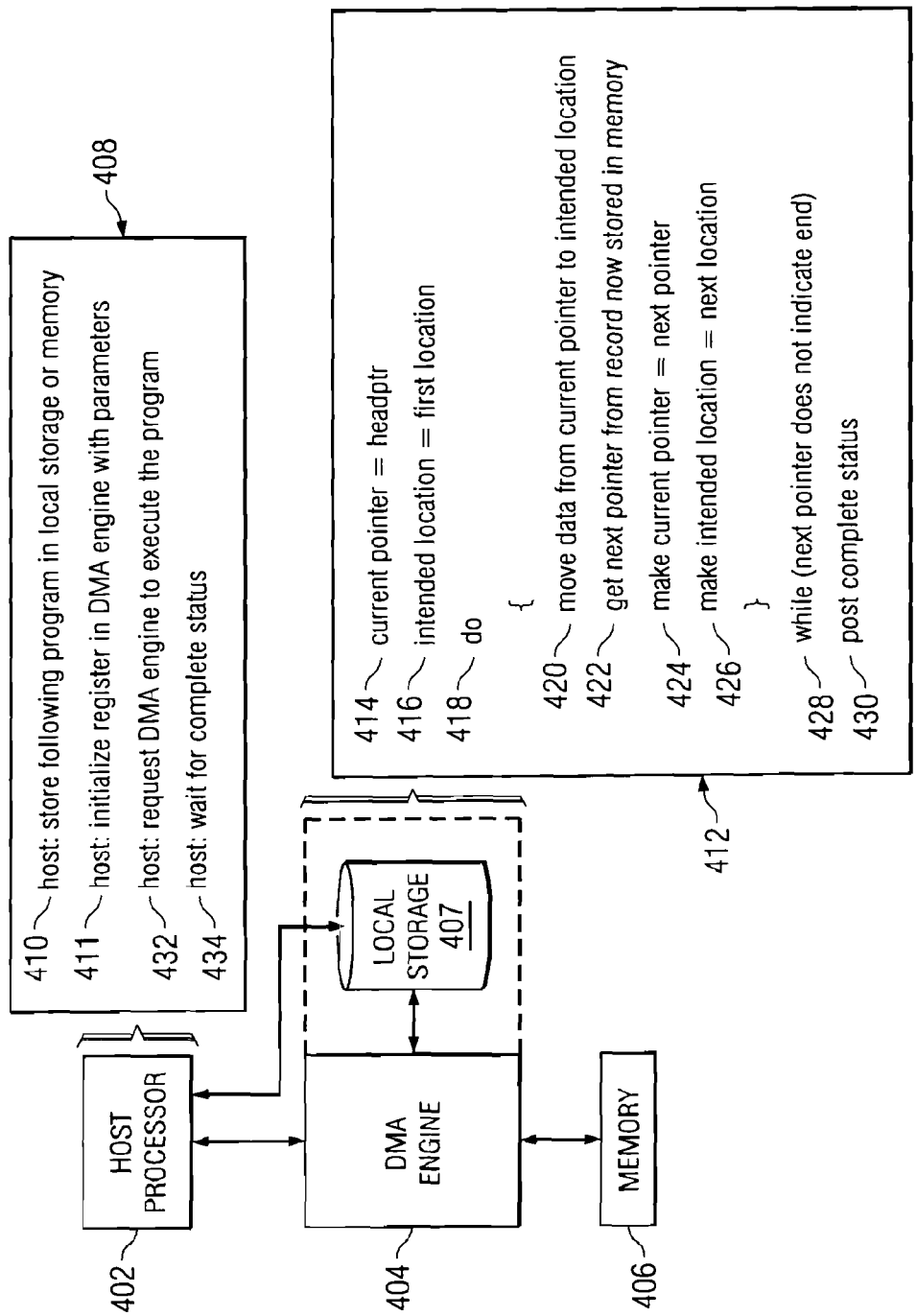
FIG. 4 illustrates an example of a process to transfer or modify data in a linked list by transferring data that is stored in memory to different locations within a memory or to a local storage using an enhanced direct memory access (DMA) engine in accordance with one illustrative embodiment.

FIG. 4 illustrates an example of a process to transfer or modify data in a linked list by transferring data that is stored in memory to different locations within a memory or to a local storage using an enhanced direct memory access (DMA) engine in accordance with one illustrative embodiment. In this example, when data is to be transferred to a memory, host processor 402, such as a synergistic processor unit (SPU), power processor element (PPE), or the like, may store a program in local storage 407 which may be a memory within or directly accessible (as shown by dashed box) by enhanced DMA engine 404. Pseudo code 408 depicts an example of an interaction between host processor 402 and enhanced DMA engine 404.

In pseudo code 408, host processor 402 stores program 412 in local storage 407 or memory 406 at step 410 and initializes registers within DMA engine 404 with parameters at step 411. The parameters that host processor 402 initializes may be a head pointer (headptr) and a first location pointer. The headptr and the first location pointer may point to either a local storage address (LSA) in local storage 407 or an effective address (EA) in memory 406. Thus, rather than only accessing memory 406 as in the conventional DMA engine operation, DMA engine 404 of the present illustrative embodiment accesses both local storage 407 and memory 406 using either a LSA or an EA as initialized by host processor 402. DMA engine 404 may then load, store, or move data to and from memory 406 and local storage 407 using a rich set of instructions with which DMA engine 404 is programmed.

Program 412, which will be executed entirely by enhanced DMA engine 404 and without intervention by host processor 402, sets a current pointer of the data equal to the headptr at step 414 and sets an intended location pointer of the data in memory equal to the first location pointer at step 416. At step 418, enhanced DMA engine 404 implements a do function. At step 420, enhanced DMA engine 404 moves data from the address indicated by the current pointer to the address indicated by the intended location pointer, then gets the next pointer from record now stored in memory at step 422. Enhanced DMA engine 404 then makes the current pointer equal to the next pointer at step 424 and makes intended location pointer equal to next location at step 426. The do function continues until the next pointer indicates an end at step 428. If at step 428 the next pointer indicates an end, enhanced DMA engine 404 posts a complete status back to host processor 402 at step 430.

Program 412 is not executed by enhanced DMA engine 404 until, at step 432 in pseudo code 408, host processor 402 requests enhanced DMA engine 404 to execute program 412 in local storage 407. Then host processor 402 waits for the complete status from enhanced DMA engine 404 at step 434 and the data from the linked list is now in a series of data buffers in memory 406. The interaction of host processor 402 may again be driven by an interrupt on DMA complete command. However, by enhanced DMA engine 404 solely executing program 412, host processor 402 may now process other tasks while program 412 is being processed. That is, host processor 402 needs to do very little to drive the data transfer and may concentrate on the data processing that is necessary after the data in the linked list is available in memory 406.

In order for enhanced DMA Engine 404 to execute program 412, enhanced DMA engine 404 requires a rich set of instructions. For example, enhanced DMA engine 404 may be programmed to perform instructions, such as:
  condition branch;
  compare;
  add, subtract, multiply, divide, rotation, shift, logical and,
    logical or, logical xor, or logical invert;
  floating point add, floating point multiply, floating point
    divide, or floating point compare;
  load immediate value;
  load value from memory;
  store value to memory;
  load value from storage;
  store value to storage;
  move data from memory to storage;
  move data from storage to memory;
  complete and return status;
  get transfer status;
  atomic locking operations such as test and set, load and
    reserve/store conditional, or start critical;
  section/end critical section;
  sync, which ensures that all previous instructions have
    completed before the next instruction is initiated;
  eieio, which ensures that cache-inhibited storage access
    are performed in main memory in the order specified by
    the program; or
  other instructions performed in processor architectures,
    such as those instructions included in instruction architectures, such as those in complex instruction set computer (CISC) architecture, reduced instruction set computing (RISC) architecture, very long instruction word (VLIW) architecture, minimal instruction set computer (MISC) architecture, explicitly parallel instruction computing (EPIC) architecture single instruction, multiple data (SIMD) architecture, or the like.

A sync instruction provides an ordering function that ensures that all instructions initiated prior to the sync instruction complete, and that no subsequent instructions initiate until after the sync instruction completes. When the sync instruction completes, all storage accesses initiated prior to the sync instruction are complete. As an example of the use of sync instruction, the following code makes the processor wait until the result of the data cache block flush (dcbf) instruction is written into main memory:

Assume that GPR 4 holds 0x0000 3000.
dcbf 1,4
sync
Wait for memory to be updated.

An eieio instruction provides an ordering function that ensures that all load and store instructions initiated prior to the eieio instruction complete in main memory before any loads or stores subsequent to the eieio instruction access memory. If the eieio instruction is omitted from a program, and the memory locations are unique, the accesses to main storage may be performed in any order. As an example of the use of eieio instruction, the following code ensures that, if the memory locations are in cache-inhibited storage, the load from location AA and the store to location BB are completed in main storage before the content of location CC is fetched or the content of location DD is updated:

load word and zero (lwz) r4,AA(r1)
store (stw) r4,BB(r1)
eieio
lwz r5,CC(r1)
stw r5,DD(r1)

A note should be made that if the memory locations of AA, BB, CC, and DD are not in cache-inhibited memory, the eieio instruction has no effect on the order that instructions access memory.

To execute these instructions, enhanced DMA engine 404 may include facilities to facilitate the execution of instructions with which DMA engine 404 is programmed, such as:
- a pointer to the next instruction to be executed which might be either of the two memories;
- a set of registers for intermediate results that might have special purpose uses;
- a stack for procedure parameters and intermediate results;
- a set of data buffers; or
- a set of flags indicating various status and conditions.

Enhanced DMA engine 404 may also be programmed to support certain predefined subroutines to implement scatter, gather, strided accesses, or other common data transfer paradigms.

In another illustrative embodiment, enhanced DMA engines, such as enhanced DMA engine 404 of FIG. 4, that support multiple simultaneous commands may improve their support by including a set of program counters and a set of private states set for each of the commands the enhanced DMA engine is capable of supporting. By providing a private state and the set of program counters for each DMA command entry supported by the enhanced DMA engine, the enhanced DMA engine in essence operates as a multi-threaded processor processing one or more of the programs simultaneously, either in parallel or in an interleaved fashion. Thus, the DMA engine may support several set of the facilities mentioned previously in order to facilitate the execution of instructions with which DMA engine is programmed. Operating as a multi-threaded processor is particularly advantageous in a heterogeneous processing system, such as data processing system 100 of FIG. 1, that features one or more processors optimized to run a single, long running thread. In this illustrative embodiment the DMA command entries become lightweight threads and the enhanced DMA engine becomes a multi-threaded processor. Light-weight threads that have lots of memory access may be forked from the single thread processor to the enhanced DMA engine, so as not to thrash the single thread processor with thread switch events.

Thus, the illustrative embodiments provide a mechanism for an enhanced direct memory access (DMA) engine that comprises a complex instruction set and that may operate either as a single thread processor or a multi-threaded processor. DMA requests from a host processor are coded in programs written in the DMA instruction set. The entire DMA instruction set is then executed by the DMA engine with limited host processor supervision and the host processor does very little to drive the data transfer and may concentrate on the data processing that is necessary after the data in the linked list is available in the memory.

Figure 5:
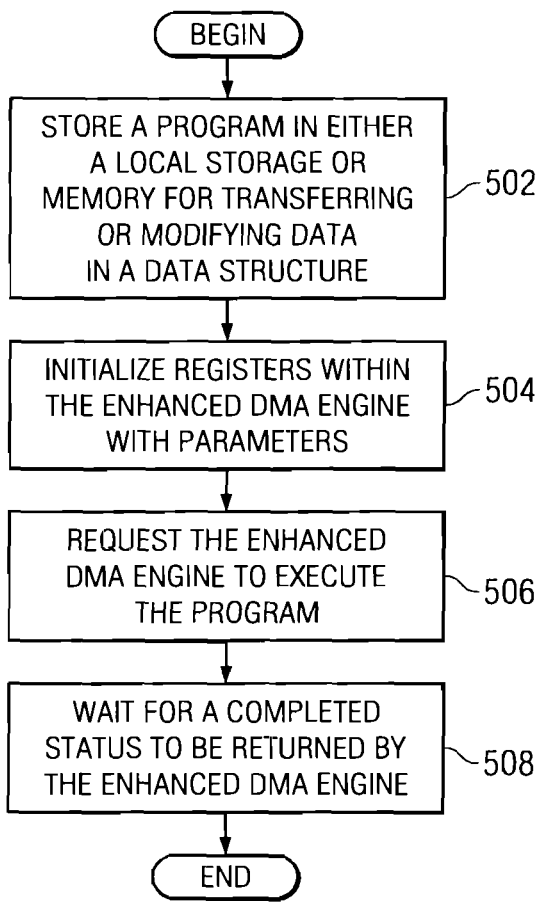
FIG. 5 depicts an example operation performed by a host processor interacting with an enhanced direct memory access (DMA) engine in accordance with one illustrative embodiment.

FIG. 5 depicts an example operation performed by a host processor interacting with an enhanced direct memory access (DMA) engine in accordance with one illustrative embodiment. As the operation begins, the host processor stores a program in either a local storage or a memory for transferring or modifying data in a data structure (step 502). The host processor initializes registers within the enhanced DMA engine with parameters that point to either a local storage address (LSA) in the local storage or an effective address (EA) in the memory (step 504). The host processor then requests the enhanced DMA engine to execute the program (step 506). Finally, the host processor waits for a completed status to be returned by the enhanced DMA engine (step 508), with the process ending thereafter.

Figure 6:
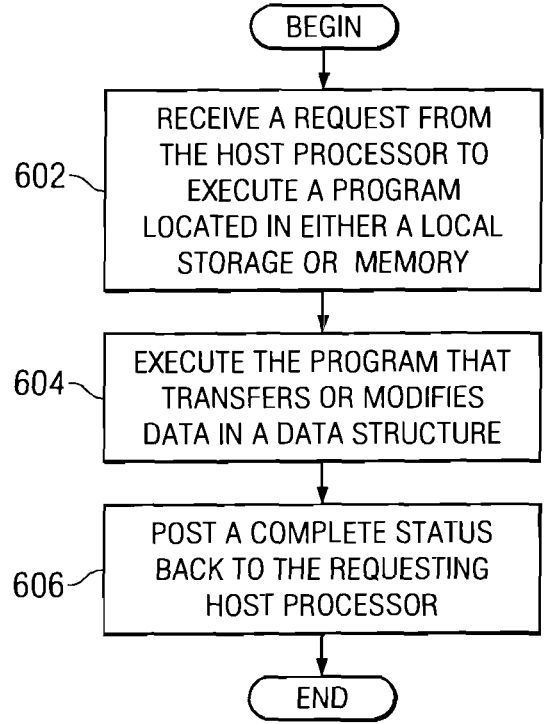
FIG. 6 depicts an example operation performed by an enhanced direct memory access (DMA) engine interacting with a host processor in accordance with one illustrative embodiment.

FIG. 6 depicts an example operation performed by an enhanced direct memory access (DMA) engine interacting with a host processor in accordance with one illustrative embodiment. As the operation begins, the enhanced DMA engine receives a request from the host processor to execute a program located in either a local storage or a memory (step 602). The enhanced DMA engine then executes the program that transfers or modifies data in a data structure (step 604). The instructions in the program executed by the enhanced DMA engine may include one or more of the following instructions described above. Once the enhanced DMA engine executes the program in its entirety, the enhanced DMA engine posts a complete status back to the requesting host processor (step 606), with the operation ending thereafter.

Thus, the illustrative embodiments provide mechanisms for an enhanced direct memory access (DMA) engine that comprises a complex instruction set and that may operate either as a single thread processor or a multi-threaded processor. DMA requests from a host processor are coded in programs written in the DMA instruction set. The entire DMA instruction set is then executed by the DMA engine with limited host processor supervision and the host processor does very little to drive the data transfer and may concentrate on the data processing that is necessary after the data in the data structure is available in local storage or memory.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present disclosure has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for programming a direct memory access engine operating as a multithreaded processor, the method comprising:
    receiving, from a host processor, a plurality of programs in either a local storage or a memory associated with the direct memory access engine;
    receiving a request, from the host processor, in the direct memory access engine, to execute the plurality of programs located in either the local storage or the memory using a set of parameters;
    executing, by the direct memory access engine and without intervention by a host processor, two or more of the plurality of programs; and
    as each of the two or more of the plurality of programs completes execution, sending, by the direct memory access engine, a completion notification to the host processor that indicates that the program has completed execution, wherein:
    the direct memory access engine is programmed to recognize a plurality of predefined direct memory access instructions of a direct memory access engine instruction set,
    the direct memory access engine instruction set comprises at least one instruction for causing the predefined direct memory access instruction to execute at least one of a first predefined subroutine, of the direct memory access engine, to implement a scatter access of the memory, a second predefined subroutine, of the direct memory access engine, to implement a gather access of the memory, or a third predefined subroutine, of the direct memory access engine, to implement a strided access of the memory,
    the direct memory access engine is further configured to execute a plurality of direct memory access commands simultaneously, in a multithreaded manner, in response to the plurality of programs referencing the plurality of direct memory access commands, wherein each direct memory access command references one or more of the predefined direct memory access instructions, and
    the direct memory access engine comprises a set of program counters and a set of private state facilities for each direct memory access command, in the plurality of direct memory access commands, executed simultaneously by the direct memory access engine, and executes the plurality of direct memory access commands simultaneously using the set of program counters and set of private state facilities.

2. A method, in a data processing system, for programming a direct memory access engine operating as a multithreaded processor, the method comprising:
    receiving, from a host processor, a plurality of programs in either a local storage or a memory associated with the direct memory access engine;
    receiving a request, from the host processor, in the direct memory access engine, to execute the plurality of programs located in either the local storage or the memory using a set of parameters;
    executing, by the direct memory access engine and without intervention by a host processor, two or more of the plurality of programs;
    as each of the two or more of the plurality of programs completes execution, sending, by the direct memory access engine, a completion notification to the host processor that indicates that the program has completed execution;
    receiving the set of parameters from the host processor that initializes registers within the direct memory access engine with a pointer to a data structure and a first location pointer, wherein the pointer to the data structure points to at least one of a local storage address in a local storage or an effective address in a memory and wherein the first location pointer points to at least one of a local storage address in a local storage or an effective address in a memory;
    setting a current pointer of data that is to be accessed equal to the pointer to the data structure;
    setting an intended location for the data equal to the first location pointer; and
    executing one of a plurality of instructions on the data using the current pointer and the intended location pointer, wherein:
    the direct memory access engine is programmed to recognize a plurality of predefined direct memory access instructions of a direct memory access engine instruction set,
    the direct memory access engine instruction set comprises at least one instruction for causing the predefined direct memory access instruction to execute at least one of a first predefined subroutine, of the direct memory access engine, to implement a scatter access of the memory, a second predefined subroutine, of the direct memory access engine, to implement a gather access of the memory, or a third predefined subroutine, of the direct memory access engine, to implement a strided access of the memory.

3. The method of claim 1, wherein the direct memory access engine is programmed with at least one instruction to modify the data within a data structure selected from the set of instructions consisting of: condition branch, compare, add, subtract, multiply, divide, rotation, shift, logical and, logical or, logical xor, logical invert, floating point add, floating point multiply, floating point divide, and floating point compare.

4. The method of claim 1, wherein the direct memory access engine is programmed with at least one instruction to modify the data within a data structure selected from the set of instructions consisting of: load immediate value, load value from memory, store value to memory, load value from storage, store value to storage, move data from memory to storage, and move data from storage to memory.

5. The method of claim 1, wherein the direct memory access engine is programmed with at least one instruction to modify the data within a data structure selected from the set of instructions consisting of: complete and return status, get transfer status, atomic locking, section/end critical section, sync, and eieio.

6. A computer program product comprising a non-transitory computer recordable medium having a computer readable program recorded thereon, wherein the computer readable program, when executed on a computing device, causes the computing device to:

receive, from a host processor, a plurality of programs in either a local storage or a memory associated with a direct memory access engine;

receive a request, from the host processor, to execute the plurality of programs located in either the local storage or the memory using a set of parameters;

execute, without intervention by a host processor, two or more of the plurality of programs; and as each of the two or more of the plurality of programs completes execution, send a completion notification to the host processor that indicates that the program has completed execution, wherein:

the direct memory access engine is programmed to recognize a plurality of predefined direct memory access instructions of a direct memory access engine instruction set, the direct memory access engine instruction set comprises at least one predefined direct memory access instruction for causing the direct memory access instruction to execute at least one of a first predefined subroutine, of the direct memory access engine, to implement a scatter access of the memory, a second predefined subroutine, of the direct memory access engine, to implement a gather access of the memory, or a third predefined subroutine, of the direct memory access engine, to implement a strided access of the memory, the direct memory access engine is further configured to execute a plurality of direct memory access commands simultaneously, in a multithreaded manner, in response to the plurality of programs referencing the plurality of predefined memory access commands, wherein each direct memory access command references one or more of the predefined direct memory access instructions, and the direct memory access engine comprises a set of program counters and a set of private state facilities for each direct memory access command, in the plurality of direct memory access commands, executed simultaneously by the direct memory access engine and executes the plurality of direct memory access commands simultaneously using the set of program counters and set of private state facilities.

7. A computer program product comprising a recordable medium having a computer readable program recorded thereon, wherein the computer readable program, when executed on a computing device, causes the computing device to:

receive, from a host processor, a plurality of programs in either a local storage or a memory associated with a direct memory access engine;

receive a request, from the host processor, to execute the plurality of programs located in either the local storage or the memory using a set of parameters;

execute, without intervention by a host processor, two or more of the plurality of programs;

as each of the two or more of the plurality of programs completes execution, send a completion notification to the host processor that indicates that the program has completed execution;

receive the set of parameters from the host processor that initializes registers within the direct memory access engine with a pointer to a data structure and a first location pointer, wherein the pointer to the data structure points to at least one of a local storage address in a local storage or an effective address in a memory and wherein the first location pointer points to at least one of a local storage address in a local storage or an effective address in a memory;

set a current pointer of data that is to be accessed equal to the pointer to the data structure;

set an intended location for the data equal to the first location pointer; and execute one of a plurality of instructions on the data using the current pointer and the intended location pointer, wherein:

the direct memory access engine is programmed to recognize a plurality of predefined direct memory access instructions of a direct memory access engine instruction set, the direct memory access engine instruction set comprises at least one predefined direct memory access instruction for causing the direct memory access instruction to execute at least one of a first predefined subroutine, of the direct memory access engine, to implement a scatter access of the memory, a second predefined subroutine, of the direct memory access engine, to implement a gather access of the memory, or a third predefined subroutine, of the direct memory access engine, to implement a strided access of the memory.

8. The computer program product of claim 6, wherein the host processor is able to execute other instructions during the time the direct memory access engine is executing the two or more of the plurality of programs.

9. The computer program product of claim 6, wherein the direct memory access engine is programmed with at least one instruction to modify the data within a data structure selected from the set of instructions consisting of: condition branch, compare, add, subtract, multiply, divide, rotation, shift, logical and, logical or, logical xor, logical invert, floating point add, floating point multiply, floating point divide, and floating point compare.

10. The computer program product of claim 6, wherein the direct memory access engine is programmed with at least one instruction to modify the data within a data structure selected from the set of instructions consisting of: load immediate value, load value from memory, store value to memory, load value from storage, store value to storage, move data from memory to storage, and move data from storage to memory.

11. The computer program product of claim 6, wherein the direct memory access engine is programmed with at least one instruction to modify the data within a data structure selected from the set of instructions consisting of: complete and return status, get transfer status, atomic locking, section/end critical section, sync, and eieio.

12. An apparatus, comprising:
a direct memory access engine;
a local storage coupled to the direct memory access engine; and
a memory coupled to the direct memory access engine, wherein either the local storage or the memory receives, from a host processor, a program that comprises instructions which, when executed by the direct memory access engine, cause the direct memory access engine to:
receive a request, from the host processor, to execute the plurality of programs located in either the local storage or the memory using a set of parameters;
execute, without intervention by a host processor, two or more of the plurality of programs; and
as each of the two or more of the plurality of programs completes execution, send a completion notification to the host processor that indicates that the program has completed execution, wherein:
the direct memory access engine is programmed to recognize a plurality of predefined direct memory access instructions of a direct memory access engine instruction set,
the direct memory access engine instruction set comprises at least one predefined direct memory access instruction for causing the direct memory access instruction to execute at least one of a first predefined subroutine, of the direct memory access engine, to implement a scatter access of the memory, a second predefined subroutine, of the direct memory access engine, to implement a gather access of the memory, or a third predefined subroutine, of the direct memory access engine, to implement a strided access of the memory,
the direct memory access engine is further configured to execute a plurality of direct memory access commands simultaneously, in a multithreaded manner, in response to the plurality of programs referencing the plurality of predefined memory access commands, wherein each direct memory access command references one or more of the predefined direct memory access instructions, and
the direct memory access engine comprises a set of program counters and a set of private state facilities for each direct memory access command, in the plurality of direct memory access commands, executed simultaneously by the direct memory access engine and executes the plurality of direct memory access commands simultaneously using the set of program counters and set of private state facilities.

13. An apparatus, comprising:
a direct memory access engine;
a local storage coupled to the direct memory access engine; and
a memory coupled to the direct memory access engine, wherein either the local storage or the memory receives, from a host processor, a program that comprises instructions which, when executed by the direct memory access engine, cause the direct memory access engine to:
receive a request, from the host processor, to execute the plurality of programs located in either the local storage or the memory using a set of parameters;
execute, without intervention by a host processor, two or more of the plurality of programs;
as each of the two or more of the plurality of programs completes execution, send a completion notification to the host processor that indicates that the program has completed execution;
receive a set of parameters from the host processor that initializes registers within the direct memory access engine with a pointer to a data structure and a first location pointer, wherein the pointer to the data structure points to at least one of a local storage address in a local storage or an effective address in a memory and wherein the first location pointer points to at least one of a local storage address in a local storage or an effective address in a memory;
set a current pointer of data that is to be accessed equal to the pointer to the data structure;
set an intended location for the data equal to the first location pointer; and
execute one of a plurality of instructions on the data using the current pointer and the intended location pointer, wherein:
the direct memory access engine is programmed to recognize a plurality of predefined direct memory access instructions of a direct memory access engine instruction set, and
the direct memory access engine instruction set comprises at least one predefined direct memory access instruction for causing the direct memory access instruction to execute at least one of a first predefined subroutine, of the direct memory access engine, to implement a scatter access of the memory, a second predefined subroutine, of the direct memory access engine to implement a gather access of the memory, or a third predefined subroutine, of the direct memory access engine, to implement a strided access of the memory.

14. The apparatus of claim 12, wherein the host processor is able to execute other instructions during the time the direct memory access engine is executing the two or more of the plurality of programs.

15. The apparatus of claim 12, wherein the direct memory access engine is programmed with at least one instruction to modify the data within a data structure selected from the set of instructions consisting of: condition branch, compare, add, subtract, multiply, divide, rotation, shift, logical and, logical or, logical xor, logical invert, floating point add, floating point multiply, floating point divide, and floating point compare.

16. The apparatus of claim 12, wherein the direct memory access engine is programmed with at least one instruction to modify the data within a data structure selected from the set of instructions consisting of: load immediate value, load value from memory, store value to memory, load value from storage, store value to storage, move data from memory to storage, and move data from storage to memory.

17. The apparatus of claim 12, wherein the direct memory access engine is programmed with at least one instruction to modify the data within a data structure selected from the set of instructions consisting of complete and return status, get transfer status, atomic locking, section/end critical section, sync, and eieio.

* * * * *